Nov. 6, 1923.
T. G. DADE
1,473,085
WHEEL
Filed May 14, 1923
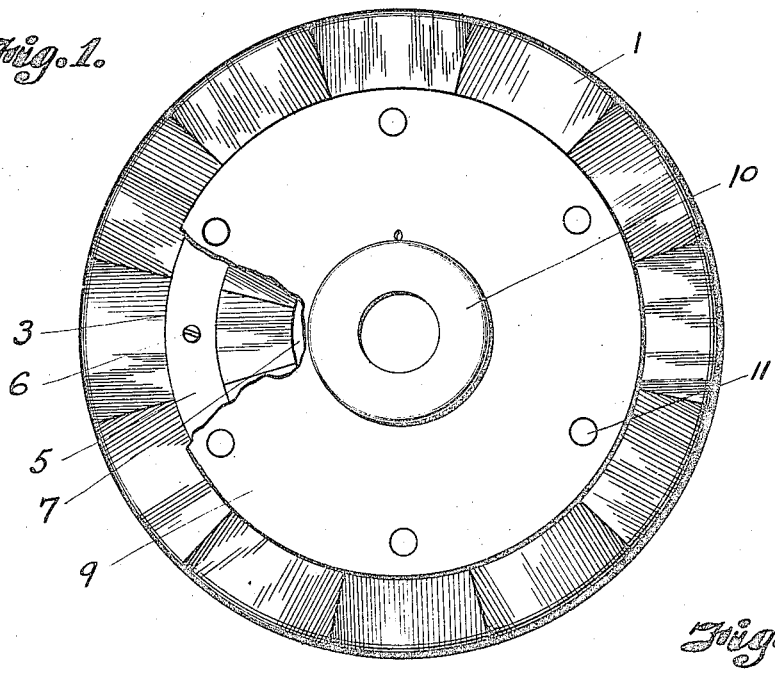
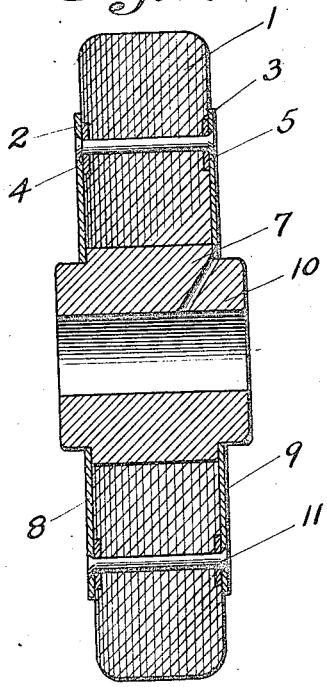
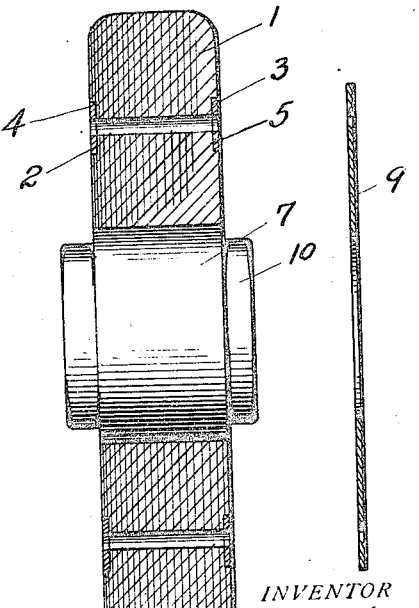
INVENTOR
Thomas G. Dade.
BY
ATTORNEY Patented Nov. 6, 1923.

1,473,085

UNITED STATES PATENT OFFICE.

THOMAS G. DADE, OF ST. MARYS, OHIO.

WHEEL.

Application filed May 14, 1923. Serial No. 638,881.

*To all whom it may concern:*

Be it known that I, THOMAS G. DADE, a citizen of the United States, residing at St. Marys, in the county of Auglaize and State of Ohio, have invented certain new and useful Improvements in Wheels; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to wheels and the primary object thereof is to provide a unitary tire structure separate from the wheel and consisting of blocks arranged in circular series so secured together that a tire will be formed ready to be placed upon the wheel.

The blocks are cut so that their fibres extend radially of the wheel, the ends of the fibers of the wood coming into contact with the floor and the tire structure is so designed as to throw the pressure between the blocks to the periphery of the wheel rather than to the side. This is accomplished by employing inset rings on opposite sides of the blocks which can be fastened to the blocks to make a ring or tire prior to placing the tire on the wheel.

The preferred construction of the invention is illustrated in the accompanying drawings, in which Fig. 1 is a side elevational view of a wheel constructed in accordance with my invention, part of one side plate being broken away to show the ring inset in the block.

Fig. 2 is a vertical, longitudinal, sectional view through the wheel, and

Fig. 3 is a sectional view of the hub and blocks with the side plates shown detached.

The tire is shown as comprising a plurality of blocks 1, the blocks being cut so that their fibers run radially of the wheel; that is, the ends of the fibers are exposed at the periphery of the tire. The blocks are segmental blocks in circular series. Each block is in the form of a wedge and its end abuts tightly against the end of an adjacent block. The blocks are formed with arcuate grooves 2 and 3 on opposite sides, the arcuate grooves of all of the blocks being scribed from a common center so that when the blocks are brought end to end, an annular groove will be formed on each side of the tire.

Each groove receives an inset ring, the rings being indicated at 4 and 5. These rings may be fastened to certain of the blocks by screws 6, the whole unitary structure being formed into a tire before the tire is placed upon the wheel.

The wheel is preferably formed by pressing in the blocks so that they will tightly bind one against the other and their position is then assured by the rings 4 and 5. The rings are preferably arranged midway between the ends of the blocks as shown and after the tire is placed upon the wheel hub 7, it may be secured by two side or web plates 8 and 9, which overlap the shoulder 10 of the hub at their inner edges.

The plates 8 and 9 are fastened to the tire by rivets 11, which pass through the plates, through the ring and through the blocks, as clearly seen in Fig. 2. The plates 8 and 9 clamp the tire firmly to the hub and hold the tire in position. The strain in a sidewise direction is taken off the blocks by the inset rings and the screws which hold them and also by the rivets. All of the strain or compression due to the load will be directed longitudinally of the fibers, it being understood that the fibers run longitudinally and that the wear comes on the end of the fibers.

I do not make any claim to the wedge-shaped blocks per se cut so that the fibers will run longitudinally of the blocks but the invention consists rather in the arrangement of the rings, screws, side plates and rivets which make a compact, efficient wheel and also in the construction of the tire which is made separable from the wheel hub and then put in place.

What I claim and desire to secure by Letters-Patent is:

1. A wheel tire comprising a plurality of wedge-shaped blocks arranged end to end, each block having its fibers running radially of the center of the tire, and rings inset in the sides of the blocks to hold them together, in combination with a hub and, side plates fastening the tire to the hub.

2. A wheel tire comprising a plurality of wedge-shaped blocks arranged end to end, each block having its fibers running radially of the center of the tire, rings inset in the sides of the blocks to hold them together, in combination with a hub, side plates engaging the hub and opposite faces of the tire, and rivets projecting through the side plates and through the blocks.

In testimony whereof I affix my signature.

THOMAS G. DADE.